United States Patent
O'Callaghan et al.

(10) Patent No.: US 7,727,496 B2
(45) Date of Patent: Jun. 1, 2010

(54) SOLVENT EXTRACTION OF IMPURITY METALS FROM A VALUABLE METAL SULPHATE SOLUTION

(75) Inventors: John O'Callaghan, Kalamunda (AU); Tony Chamberlain, Bicton (AU)

(73) Assignee: WMC Resources Ltd., Perth, Western Australia (AU)

(*) Notice: Subject to any disclaimer, the term of this patent is extended or adjusted under 35 U.S.C. 154(b) by 1722 days.

(21) Appl. No.: 10/168,704

(22) PCT Filed: Dec. 19, 2000

(86) PCT No.: PCT/AU00/01557

§ 371 (c)(1),
(2), (4) Date: Oct. 15, 2002

(87) PCT Pub. No.: WO01/48252

PCT Pub. Date: Jul. 5, 2001

(65) Prior Publication Data

US 2003/0064013 A1 Apr. 3, 2003

(30) Foreign Application Priority Data

Dec. 24, 1999 (AU) .................................. PQ4893

(51) Int. Cl.
B01D 11/00 (2006.01)
(52) U.S. Cl. ........................................ 423/139; 210/634
(58) Field of Classification Search .................. 423/139
See application file for complete search history.

(56) References Cited

U.S. PATENT DOCUMENTS 2,716,588 A * 8/1955 Hall ............................ 423/36
3,131,998 A * 5/1964 Swanson ..................... 423/139

(Continued)

FOREIGN PATENT DOCUMENTS

AU 667539 3/1996

(Continued)

OTHER PUBLICATIONS

Ritcey, G.M. et al., 1975. "Development of a Solvent Extraction Process for the Separation of Cobalt from Nickel", CIM Bulletin, Jan. 1975 (pp. 111-123).

(Continued)

*Primary Examiner*—Stanley Silverman
*Assistant Examiner*—Paul Wartalowicz
(74) *Attorney, Agent, or Firm*—Miles & Stockbridge P.C.; David R. Schaffer, Esq.; Michael A. Minter, Esq.

(57) ABSTRACT

The present invention relates generally to a method of extracting cobalt and other impurity metals from a concentrated nickel sulphate solution by a solvent extraction process whereby a cationic solvent extractant is separately pre-equilibrated with a portion of a purified nickel sulphate solution in such a manner that it is loaded with nickel without precipitating insoluble nickel double salts. The nickel loaded extracted is then transferred to an impure cobalt nickel solution where the cobalt and certain other impurity metals exchange with nickel leaving a purified concentrated nickel sulphate solution suitable for hydrogen reduction or electrowinning. The cobalt loaded extractant is stripped with dilute sulphuric acid before being recycled while an aqueous cobalt stripped solution is further processed to recover cobalt.

13 Claims, 2 Drawing Sheets

U.S. PATENT DOCUMENTS

| | | | | |
|---|---|---|---|---|
| 3,251,646 | A | * | 5/1966 | Mitzmager et al. ............ 423/24 |
| 3,981,968 | A | | 9/1976 | Miller et al. |
| 4,115,512 | A | * | 9/1978 | Kerfoot ........................ 423/24 |
| 4,348,367 | A | * | 9/1982 | Rickelton et al. ........... 423/139 |
| 5,779,997 | A | | 7/1998 | Hultholm |
| 6,039,790 | A | * | 3/2000 | Hultholm et al. .............. 75/739 |
| 6,149,885 | A | * | 11/2000 | Makino et al. .............. 423/139 |

FOREIGN PATENT DOCUMENTS

| | | | |
|---|---|---|---|
| GB | 2324 792 A | | 4/1998 |
| GB | 2324790 A | | 4/1998 |
| GB | 2 324 790 A | | 11/1998 |
| GB | 2 324 792 A | | 11/1998 |
| WO | WO 98/56482 | * | 12/1998 |
| WO | WO 98/56482 A1 | | 12/1998 |

OTHER PUBLICATIONS

Bautista, Renato G., 1993 "The Solvent Extraction of Nickel, Cobalt and their Associated Metals". The Paul B. Queneau International Symposium. Extractive Metallurgy of Copper, Nickel and Cobalt. vol. 1, Fundamental Aspects (pp. 826-853).

Shubinok, A.V., 1992 Conditioning of solutions of copper heap leaching copper from oxidized ores at the Kounradsky deposits. Tsvetn. Met. (Moscow) vol. 4, pp. 12-14.

Hubicki, A., et al., 1999 Removal of Cobalt(II), Zinc(II) and Copper(II) from Nickel Sulfate Solutions by Solvent Extraction. Chem. Environ. Res. vol. 8 (3&4) pp. 319-335.

Barnes, John E. et al. Australian patent specification AU 13178/76 "Separation of Cobalt and Nickel".

Nikolic, C., et al., "The Amax Port Nickel Refinery Process for Cobalt Purification and Recovery". Process and Fundam. (pp. 115-121).

Ritcey, G.M. et al., Solvent Extraction: Principles and Applications to Process Metallurgy Part II. Elsevier Scientific (Amsterdam) pp. 284-287.

Sarma, Bhaskara P.V.R., et al. "Processing of Nickel—and Cobalt—Containing Leach Liquors Obtained from Different Raw Materials" 1987. Hydrometallurgy, vol. 19, pp. 83-93.

Statement of Grounds and Particulars, In the Matter of Australian Patent Application 200123288 (782112) in the name of WMC Resources Limited.

* cited by examiner

SOLVENT EXTRACTION OF IMPURITY METALS FROM A VALUABLE METAL SULPHATE SOLUTION

FIELD OF THE INVENTION

The present invention relates generally to a method of extracting impurity metal ions from a valuable metal sulphate stream in a solvent extraction circuit and relates particularly, though not exclusively, to the extraction of cobalt and other impurity metals from a nickel sulphate solution. The invention also relates to a method of pre-equilibrating a cationic solvent extractant.

BACKGROUND TO THE INVENTION

FIG. 1 is a flowsheet of a known method of extracting cobalt from a nickel sulphate solution with a direct addition of ammonia to a cobalt solvent extraction phase. A problem with this method is that the concentrated nickel sulphate solution with the direct addition of ammonia results in the formation of insoluble nickel ammonium sulphate double salts. Australian patent No. 667539 in the name of Outokumpu sets out to avoid the formation of this double salt by a two stage process involving:
i) pre-neutralisation of a cationic extractant such as CYANEX 272 to form the ammonium salt; and
ii) pre-extraction or exchange of the CYANEX 272 ammonium salt with magnesium sulphate in an aqueous solution to form a CYANEX 272 magnesium salt which is contacted with an aqueous nickel sulphate solution in a solvent extraction circuit so as to extract nickel.

The applicants International patent application No. PCT/AU98/00457 avoids the relatively expensive two stage pre-equilibration of Outokumpu by adding chemically reactive magnesia, magnesium hydroxide, or magnesium carbonate to the cationic extractant without the pre-neutralisation step. However, if magnesia or magnesium pre-equilibrated extractant is used to avoid the formation of double salts this introduces magnesium ions which contaminate the final ammonium sulphate product.

SUMMARY OF THE INVENTION

According to one aspect of the present invention there is provided a method of pre-equilibrating a cationic solvent extractant, said method involving contacting the cationic extractant with a portion of a purified valuable metal stream wherein valuable metal ions of said portion of the purified stream are loaded on the cationic extractant to form a pre-equilibrated cationic extractant.

According to another aspect of the present invention there is provided a method of extracting impurity metal ions from an impure valuable metal sulphate stream in a solvent extraction circuit, said method comprising the steps of:
i) contacting a cationic solvent extractant with a portion of a purified valuable metal sulphate stream wherein valuable metal ions of said portion of the purified stream are loaded on the cationic extractant to form a pre-equilibrated cationic extractant; and
ii) contacting the pre-equilibrated cationic extractant with the impure valuable metal sulphate stream in said solvent extraction circuit wherein the impurity metal ions exchange with the valuable metal ions whereby the pre-equilibrated cationic extractant is loaded with the impure metal ions and a raffinate of said extraction circuit is enriched in the valuable metal ions.

According to a further aspect of the present invention there is provided a method of pre-equilibrating a cationic solvent extractant, said method involving contacting the cationic extractant with an aqueous metal ion solution with the direct addition of an ammonia solution to effect loading of the metal ion on the cationic extractant to form a pre-equilibrated cationic extractant, the metal ion solution being selected or preconditioned to a predetermined concentration of the metal ions sufficient to avoid formation of insoluble ammonium/metal sulphate double salts.

Conventionally it is recognised that the direct addition of an ammonia solution to a metal ion solution is not appropriate insofar as it forms insoluble metal salts. For example, it is understood that the direct addition of an ammonia solution to a concentrated nickel sulphate solution forms insoluble nickel double salts.

Preferably the metal ion solution is preconditioned by dilution with a diluent to achieve the predetermined concentration of metal ions. More preferably the diluent is water.

Generally the metal ion solution is a portion of a purified valuable metal sulphate stream that being a raffinate of an impurity solvent extraction circuit.

Typically the purified valuable metal stream is a purified nickel sulphate stream. More typically the impurity metal ions include cobalt, copper, zinc and/or manganese.

Preferably the purified nickel sulphate stream is the raffinate of the solvent extraction circuit. More preferably the impure valuable metal sulphate stream is a concentrated nickel sulphate liquor obtained by acid pressure leaching of a nickel-cobalt sulphide mineral such as a precipitate obtained during the processing of nickel lateritic ore, or nickel mattes.

Typically pre-equilibration of the cationic extractant with the nickel ions is effected with the direct addition of an ammonia solution. More typically the portion of the purified nickel sulphate stream is preconditioned by dilution with a diluent to achieve a predetermined concentration of nickel sufficient to avoid formation of insoluble nickel double salts. Generally the diluent is water.

Alternatively pre-equilibration of the cationic extractant is effected with the direct addition of magnesia or magnesium hydroxide. In this embodiment, unlike with the addition of an ammonia solution, insoluble nickel double salts do not form and there is no need to dilute the portion of the purified nickel sulphate stream.

Preferably the method of extracting impurity metal ions further comprises the step of stripping of an impurity loaded cationic extractant from the solvent extraction circuit with sulphuric acid to yield the cationic extractant for recycle to pre-equilibration. More preferably stripping of said impurity loaded extractant produces an aqueous impurity metal strip solution which is processed to recover one or more of said impurity metal ions, such as cobalt.

Typically the method of extracting impurity metal ions also comprises the step of electrowinning a high purity electrolyte of the nickel enriched raffinate to recover high purity nickel. Alternatively the nickel enriched raffinate or a derivative thereof is subjected to hydrogen reduction.

Preferably the cationic solvent extractant comprises a phosphinic acid. More preferably the phosphinic acid is bis (2,4,4 trimethylpentyl) phosphinic acid, or a derivative thereof, such as that commercially available as CYANEX 272. Generally the cationic extractant is diluted with another diluent such as kerosene.

BRIEF DESCRIPTION OF THE DRAWINGS

In order to facilitate a better understanding of the nature of the present invention, a preferred embodiment of a method of pre-equilibrating a cationic extractant and a method of extracting impurity metal ions from a valuable metal sulphate stream in a solvent extraction circuit will now be described, by way of example only, with reference to the following flowsheets in which.

DETAILED DESCRIPTION OF THE PREFERRED EMBODIMENT

Figure 2:
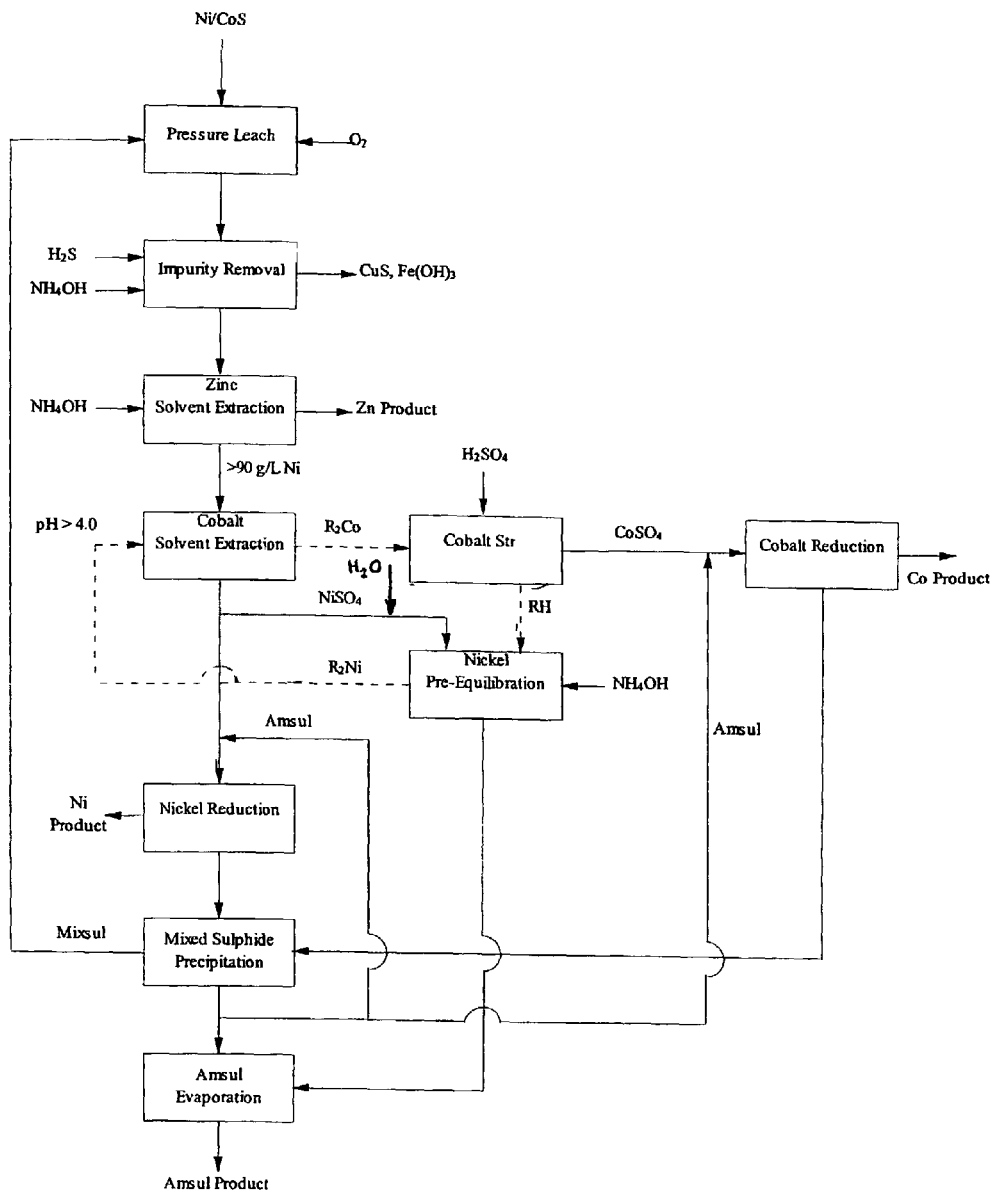
FIG. 2 shows one embodiment of a method according to the invention of extracting cobalt and other impurity metals from a nickel sulphate stream in a solvent extraction circuit.

As shown in FIG. 2 there is one embodiment of a method of extracting cobalt and other impurity metals from a concentrated nickel sulphate solution by a solvent extraction process whereby a cationic solvent extractant is separately pre-equilibrated with a portion of a purified nickel sulphate solution in such a manner that it is loaded with nickel without precipitating insoluble nickel double salts. The nickel loaded extractant is then transferred to an impure cobalt nickel solution where the cobalt and certain other impurity metals exchange with nickel leaving a purified concentrated nickel sulphate solution suitable for hydrogen reduction or electrowinning. The cobalt loaded extractant is stripped with dilute sulphuric acid before being recycled whilst an aqueous cobalt strip solution is further processed to recover cobalt.

Figure 1:
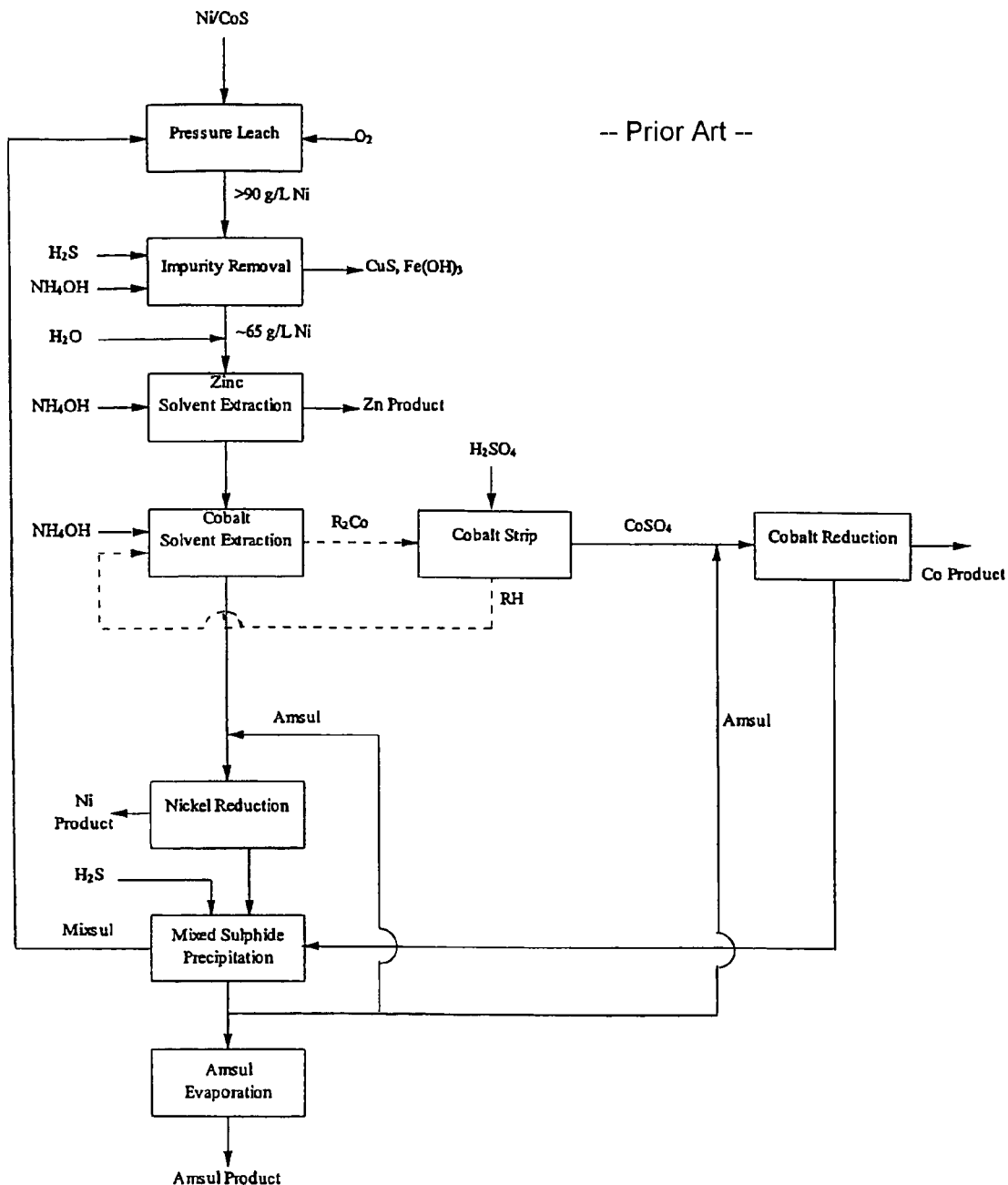
FIG. 1 depicts a known method of extracting cobalt and other impurity metals from a nickel sulphate stream in a solvent extraction circuit.

The process of this embodiment extracts cobalt and certain other impurities into a cationic extractant phase by exchanging with nickel and thus avoids the introduction of ammonia or alkali ions to the nickel solution. This direct addition of ammonia or alkali ions is required when the extractant is used directly in the known method without pre-treatment as shown in FIG. 1. By avoiding the introduction of ammonia or other alkali ions to the nickel sulphate solution, both insoluble double salts of nickel are eliminated and the end solution, after hydrogen reduction of nickel with ammonia, is a pure solution of ammonium sulphate suitable for evaporation and recovery.

To avoid the formation of double salts whilst pre-equilibrating the extractant with nickel using the ammonia solution, the portion of the nickel solution is in this embodiment sufficiently diluted with water to a concentration of between 30 to 60 g/l nickel and nickel is completely extracted by adjusting the pH. The diluted aqueous ammonium sulphate raffinate, preferably containing less than 200 ppm nickel, is evaporated or combined with a concentrated ammonium sulphate end solution after hydrogen reduction.

It should be appreciated that a variation of this pre-equilibration step includes the use of magnesia or magnesium hydroxide as an alkali to adjust the pH instead of ammonia. This addition of magnesia or magnesium hydroxide is taught in the applicant's International patent application No. PCT/AU98/00457. In this case the dilute aqueous magnesium sulphate raffinate is discarded. There is no need to dilute the portion of the nickel sulphate as there is no risk of forming the insoluble nickel double salts. This also avoids the direct addition of magnesium ions to the nickel sulphate process stream and hence produces a pure ammonium sulphate end solution after nickel recovery.

Example

A cationic organic extractant phase comprising of 0.45M CYANEX 272 (16.7% v/v) dissolved in Shellsol 2046 kerosene was contacted with a portion of a nickel sulphate solution remaining after extraction of cobalt at a temperature of 50° C. This nickel sulphate solution, which contained 67.9 g/l Ni and <50 ppm Co was diluted with an equal volume of water, and contacted for 5 minutes with organic phase at a stirring speed of 1200 rpm whilst adding 12.5% aqueous ammonia solution to maintain a constant pH. When the pH was maintained at pH 6, nickel was transferred from the aqueous phase into the organic phase which now contained 8.33 g/l Ni. This loading represents about 62% of the stoichiometric loading capacity of the extractant. When the pH was further raised to pH 6.3 with more ammonia addition, the organic phase was fully saturated with 13.48 g/l Ni. The aqueous phase contained ammonium sulphate and a lower concentration of nickel that depended upon the O/A volume ratio employed, concentration of CYANEX 272 and final pH. In other tests an ammonium sulphate solution solution containing <200 ppm Ni was obtained for evaporation and recovery of ammonium sulphate crystals. The following conditions and data are applicable to this pre-equilibration of CYANEX 272.

| | | | Aqueous, µg/mL | | | | |
|---|---|---|---|---|---|---|---|
| | PDT#, sec | pH | Ni | Co | Cu | Zn | Mn |
| Co SX Raffinate | 0 | 4.97 | 67900* | 0 | 0 | 0 | 0 |
| Test 1 Raffinate | 42 | 5.97 | 60446* | 0 | 0 | 0 | 0 |
| Test 2 Raffinte | 47 | 6.26 | 54188* | 0 | 0 | 0 | 0 |

| | Organic, µg/mL | | | | |
|---|---|---|---|---|---|
| | Ni | Co | Cu | Zn | Mn |
| Initial Stripped Organic | 0 | 1 | 0 | 2 | 0 |
| Test 1 Loaded Organic | 8330 | 9 | 0 | 29 | 0 |
| Test 2 Loaded Organic | 13480 | 10 | 0 | 43 | 0 |

| % Organic Pre-equilibration: | |
|---|---|
| | Ni |
| Test 1 | 62 |
| Test 2 | 100 |

Organic: 0.45 M (16.7% v/v) CYANEX 272 in Shellsol 2046
pH Adjustment: 12.5% Ammonia
Pre-equil. Solution: Co SX Raffinate
Vol Organic: 150 mL
O/A: 1
Temperature: 50° C.
Agitation: 1200 rpm
Contact Time: 5 minutes
Phase disengagement time
*Prior to Dilution The nickel pre-equilibrated CYANEX 272 phase was then contacted with an equal volume of an impure nickel sulphate solution containing 71.98 g/l Ni, 6.50 g/l Co, 11 ppm Cu, 5 ppm Zn and 11 ppm Mn at 50° C. After 5 minutes agitation at 1200 rpm, cobalt had transferred from the aqueous phase to the organic phase, whilst nickel transferred from the organic phase to the aqueous phase. After one contact with CYANEX 272 loaded with 8.33 g/l Ni, at a pH of 5.25, 98.7% Co was extracted, leaving 85 ppm Co in the aqueous phase and 76 ppm nickel remaining on the organic phase. When contacted with nickel saturated CYANEX 272 containing 13.48 g/l Ni at a pH of 5.75, 99.4% Co was extracted leaving 40 ppm Co in the aqueous phase and 138 ppm Ni on the organic phase. The organic phase also extracted the trace amounts of Cu, Zn and Mn. Thus the aqueous phase was purified from cobalt and other impurities whilst becoming enriched with nickel, making the solution more suitable for nickel recovery by hydrogen reduction or electrowinning. The following conditions and data relate to this extraction of cobalt and other impurities from the impure nickel sulphate solution in a solvent extraction circuit utilising the nickel pre-equilibrated CYANEX 272.

Test 1

|  | PDT, sec | Equil. pH | Ni Pre-eq. Organic | | | | |
|---|---|---|---|---|---|---|---|
|  |  |  | Ni | Co | Cu | Zn | Mn |
| PLS | 0 | 3.21 | 71980 | 6500 | 11 | 5 | 11 |
| 1$^{st}$ Contact | 49 | 5.25 | 78100 | 85 | 0 | 0 | 0 |
| 2$^{nd}$ Contact | 68 | 4.28 | 73370 | 5840 | 2 | 0 | 5 |
| 3$^{rd}$ Contact | 64 | 4.24 | 72400 | 6750 | 5 | 0 | 7 |
| Ni Pre-eq. Organic |  |  | 8330 | 9 | 0 | 29 | 0 |
| Co Loaded Organic |  |  | 76 | 7840 | 31 | 19 | 22 |

% Extraction:

|  | Ni* | Co | Cu | Zn | Mn |
|---|---|---|---|---|---|
| 1$^{st}$ Contact | −8.5 | 98.7 | 100.0 | 100.0 | 100.0 |
| 2$^{nd}$ Contact | −1.9 | 10.2 | 80.7 | 96.2 | 56.6 |
| 3$^{rd}$ Contact | −0.6 | −3.8 | 61.4 | 100.0 | 35.8 |

Test 2

|  | PDT, sec | Equil. pH | Ni Pre-eq. Organic | | | | |
|---|---|---|---|---|---|---|---|
|  |  |  | Ni | Co | Cu | Zn | Mn |
| PLS | 0 | 3.21 | 71980 | 6500 | 11 | 5 | 11 |
| 1$^{st}$ Contact | 200 | 5.76 | 79720 | 40 | 0 | 0 | 0 |
| 2$^{nd}$ Contact | 140 | 4.82 | 75590 | 3990 | 1 | 0 | 3 |
| 3$^{rd}$ Contact | 90 | 4.70 | 72720 | 6760 | 3 | 0 | 6 |
| Ni Pre-eq. Organic |  |  | 13480 | 10 | 0 | 43 | 0 |
| Co Loaded Organic |  |  | 138 | 9680 | 34 | 20 | 26 |

% Extraction:

|  | Ni* | Co | Cu | Zn | Mn |
|---|---|---|---|---|---|
| 1$^{st}$ Contact | −10.8 | 99.4 | 100.0 | 100.0 | 100.0 |
| 2$^{nd}$ Contact | −5.0 | 38.6 | 89.5 | 100.0 | 74.5 |
| 3$^{rd}$ Contact | −1.0 | −4.0 | 71.9 | 100.0 | 45.3 |

Mass Balance:

|  | Ni | Co | Cu | Zn | Mn |
|---|---|---|---|---|---|
| Unsaturated Organic | 1.04 | 0.87 | 0.89 | −1.57 | 0.93 |
| Saturated Organic | 1.10 | 0.90 | 0.88 | −0.67 | 0.90 |

Organic: 0.45 M (16.7% v/v) CYANEX 272 in Shellsol 2046
pH Adjustment: Ni Pre-equilibrated Organic
Aqueous Feed Solution: PLS (After Zn SX)
Vol. Organic: 100 mL
O/A: 1
Temperature: 50° C.
Agitation: 1200 rpm
Contact Time: 5 min
*Negative Figures denote enrichment of Ni.

The present invention is not limited to the embodiments described above and numerous variations and modifications can be made to the method of pre-equilibrating a cationic extractant, and a method of extracting impurity metal ions from a valuable metal sulphate stream which still remain within the ambit of the present invention. For example, although the embodiment described relates to pre-equilibration of a cationic extractant with a portion or side stream of a purified nickel sulphate stream, the invention also extends to other valuable metal streams such as those including cobalt, copper, and zinc. The cationic solvent extractant is not limited to CYANEX 272 but rather extends to practically any cationic extractant which extracts an impurity metal such as cobalt at a lower pH than a valuable metal such as nickel and hence is able to exchange the impurity metal for the valuable metal after pre-equilibration.

The preceding example of the present invention is provided to illustrate a specific embodiment of the invention and is not intended to limit the scope of the method of the invention.

The invention claimed is:

1. A method of extracting impurity metal ions including any one or more of cobalt, copper, zinc and manganese from an impure valuable sulphate stream in the form of a cobalt/nickel-containing stream in a solvent extractant circuit, the method comprising the steps of:
   a) contacting the cobalt/nickel-containing stream in a cobalt solvent extraction circuit with an organic solvent and producing a cobalt-loaded organic extractant and a purified nickel-containing stream;
   b) stripping cobalt from the cobalt-loaded organic extractant and producing a stripped organic extractant;
   c) directly after step (b), loading the stripped organic extractant with nickel from a part of the purified nickel-containing stream from step (a) to pre-equilibrate the organic extractant; and
   d) providing the pre-equilibrated organic extractant as the organic solvent for contacting with the cobalt/nickel-containing stream in step (a).

2. A method of extracting impurity metal ions from an impure valuable sulphate stream in a solvent extraction circuit as defined in claim 1 wherein the impure valuable sulphate stream is a concentrated nickel sulphate liquor obtained by acid pressure leaching of a nickel-cobalt sulphide mineral.

3. A method of extracting impurity metal ions from an impure valuable sulphate stream in a solvent extraction circuit as defined in claim 1 wherein pre-equilibration of the organic extractant with the nickel from a part of the purified nickel-containing stream is effected with the direct addition of an ammonia solution.

4. A method of extracting impurity metal ions from an impure valuable sulphate stream in a solvent extraction circuit as defined in claim 3 wherein the purified nickel-containing stream is preconditioned by dilution with a diluent to achieve a predetermined concentration of the nickel sufficient to avoid formation of insoluble ammonium/nickel sulphate double salts.

5. A method of extracting impurity metal ions from an impure valuable sulphate stream in a solvent extraction circuit as defined in claim 4 wherein the diluent is water.

6. A method of extracting impurity metal ions from an impure valuable sulphate stream in a solvent extraction circuit as defined in claim 1 wherein pre-equilibration of the organic extractant is effected with the direct addition of magnesia or magnesium hydroxide.

7. A method of extracting impurity metal ions from an impure valuable sulphate stream in a solvent extraction circuit as defined in claim 1 further comprising the step of stripping of an impurity loaded organic extractant from the solvent extraction circuit with sulphuric acid to yield the organic extractant for recycle to pre-equilibration.

8. A method of extracting impurity metal ions from an impure valuable sulphate stream in a solvent extraction circuit as defined in claim 7 wherein said step of stripping of said impurity loaded extractant produces an aqueous impurity metal strip solution which is processed to recover one or more of said impurity metal ions.

9. A method of extracting impurity metal ions from an impure valuable sulphate stream in a solvent extraction circuit as defined in claim 1 also comprising the step of electrowinning a high purity electrolyte of the purified nickel-containing stream to recover high purity nickel.

10. A method of extracting impurity metal ions from an impure valuable sulphate stream in a solvent extraction circuit as defined in claim 1 wherein the purified nickel-containing stream or a derivative thereof is subjected to hydrogen reduction.

11. A method of extracting impurity metal ions from an impure valuable sulphate stream in a solvent extraction circuit as defined in claim 1 wherein the organic extractant comprises a phosphinic acid.

12. A method of extracting impurity metal ions from an impure valuable sulphate stream in a solvent extraction circuit as defined in claim 11 wherein the phosphinic acid is bis (2,4,4 trimethylpentyl) phosphinic acid, or a derivative thereof.

13. A method of extracting impurity metal ions from an impure valuable sulphate stream in a solvent extraction circuit as defined in claim 4 wherein the purified nickel-containing stream is diluted with another diluent.

* * * * *